United States Patent
Steveninck

(10) Patent No.: US 11,286,398 B2
(45) Date of Patent: Mar. 29, 2022

(54) INK COMPRISING DISPERSED NANOPIGMENT MICELLES AND PRINTED TEXTILES OBTAINED THEREFROM

(71) Applicant: Fernando Nunes, Uxbridge, MA (US)

(72) Inventor: Etienne Steveninck, Morbach (DE)

(73) Assignee: Farbenpunkt, Inc., Wilmington, DE (US)

( * ) Notice: Subject to any disclaimer, the term of this patent is extended or adjusted under 35 U.S.C. 154(b) by 0 days.

(21) Appl. No.: 16/757,372

(22) PCT Filed: Oct. 17, 2018

(86) PCT No.: PCT/EP2018/078388
§ 371 (c)(1),
(2) Date: Apr. 17, 2020

(87) PCT Pub. No.: WO2019/076976
PCT Pub. Date: Apr. 25, 2019

(65) Prior Publication Data
US 2020/0385591 A1  Dec. 10, 2020

(30) Foreign Application Priority Data
Oct. 17, 2017 (BE) .................................. 2017/5745

(51) Int. Cl.
| | | |
|---|---|---|
| *C09D 11/03* | (2014.01) | |
| *C09D 11/322* | (2014.01) | |
| *C09D 11/033* | (2014.01) | |
| *C09D 11/037* | (2014.01) | |
| *C09D 11/107* | (2014.01) | |
| *D06P 1/52* | (2006.01) | |
| *D06P 5/30* | (2006.01) | |

(52) U.S. Cl.
CPC .......... *C09D 11/322* (2013.01); *C09D 11/033* (2013.01); *C09D 11/037* (2013.01); *C09D 11/107* (2013.01); *D06P 1/5214* (2013.01); *D06P 1/5278* (2013.01); *D06P 5/30* (2013.01)

(58) Field of Classification Search
CPC ... C09D 11/322; C09D 11/033; C09D 11/037; C09D 11/107; C09D 11/326; C09D 11/03; D06P 1/5214; D06P 1/5278; D06P 5/30; D06P 1/613; D06P 1/607; D06P 1/44
USPC .......................................... 442/152
See application file for complete search history.

(56) References Cited

U.S. PATENT DOCUMENTS

| | | | | |
|---|---|---|---|---|
| 5,854,331 | A * | 12/1998 | Ma ........................ | C08F 297/00 524/505 |
| 2002/0065347 | A1* | 5/2002 | Freeman ................ | C09D 11/30 524/397 |
| 2011/0038650 | A1* | 2/2011 | Kaneko ............. | G03G 9/09392 399/159 |
| 2014/0068877 | A1 | 3/2014 | Ellis | |

FOREIGN PATENT DOCUMENTS

| | | |
|---|---|---|
| CN | 101659808 A | 3/2010 |
| EP | 2643159 B1 | 4/2016 |
| JP | 11236502 | 8/1999 |
| JP | 2004210877 A | 7/2004 |
| JP | 2007161846 A | 6/2007 |
| WO | 2006130144 A1 | 12/2006 |
| WO | 2016064810 A1 | 4/2016 |

OTHER PUBLICATIONS

Machine Translation of JP 2007-161846. (Year: 2007).*
Machine Translation of CN 101659808 (Year: 2010).*

* cited by examiner

*Primary Examiner* — Hannah J Pak
(74) *Attorney, Agent, or Firm* — McInnes & McLane, LLP

(57) ABSTRACT

The present invention provides a water-based ink comprising nanopigment micelles, said nanopigment micelles comprising a pigment particle and a polymeric dispersing agent around said pigment particle, whereby said pigment particles have an average particle size between 100 nm and 250 nm. The invention also relates to a printed textile and a dyeing and printing process using said water-based ink.

24 Claims, 1 Drawing Sheet

INK COMPRISING DISPERSED NANOPIGMENT MICELLES AND PRINTED TEXTILES OBTAINED THEREFROM

RELATED APPLICATIONS

This patent is a National Entry Phase of PCT Patent Application PCT/EP2018/078388 filed Oct. 17, 2018, which claims priority to Belgium application 2017/5745 filed Oct. 17, 2017. All references cited in this section are incorporated here by reference in their entirety.

TECHNICAL FIELD

The present invention relates to the field of inks comprising pigment nanoparticles and printed textiles obtained therefrom. Also, the present invention relates to methods for preparing said inks and methods for colouring textiles with said inks.

INTRODUCTION

The colour strength and fastness of pigmented ink on textiles is generally controlled by the amount of polymeric binder added to the ink mixture. It is very difficult, however, to achieve good fastness of pigmented inks onto printed or coated fabric through increased binder addition without a detrimental change of the fabric softness. When the amount of polymeric binder is high enough to demonstrate good durability (or fastness), fabric hand becomes stiff or harsh. If the amount of binder is reduced to keep fabric hand constant, good fastness, especially fastness to crocking, cannot be achieved.

Textiles, either woven or nonwoven, are used for a wide variety of applications from clothing, wipers and diapers to automobile covers. These applications call for materials having diverse properties and attributes. Some applications call for fabrics which are highly wettable, e.g. liners for diapers and feminine hygiene products, and which are soft like clothing, or are absorbent like wipers and towels, while others require strength, e.g. protective fabrics like car and boat covers, and still others require repellency and barrier properties like medically oriented fabrics such as, for example, sterilization wraps and surgical gowns.

Improved textile printing systems are reported in literature. WO 2006/130144 describes a printing composition comprising an aqueous mixture having silica nanoparticles and silane coupling agents in addition to pigments and a relatively small amount of binder. It was found that good colour fastness and strong colour strength for inks can be achieved by using a small amount of polymeric binder with silica nanoparticles and a silane coupling agent, and that about 0.1 to 10 weight percent of silica nanoparticles with 0.5 to 20 weight percent of a silane coupling agent can improve fastness to crocking and colour strength in pigmented ink systems with acrylic or polyurethane polymeric binders. The composition may be applied by any of a myriad of means known in the art like screen printing, digital printing, dip coating, spin coating or spraying on hydrophobic and hydrophilic fabrics such as polyesters, polyolefins, cotton, nylon, silks etc. and the fabrics may be woven or nonwoven. The silane coupling agent is believed to be crosslinked between an organic polymer and inorganic silica nanoparticles and it is said that the addition of the coupling agent can enhance the durability of coated fabrics, with higher colour strength whereas traditional ink formulations rely on improving fastness properties by adding polymeric binder such as acrylic and polyurethane binder. In order to improve the binder characteristics, cross-linkable polyurethane binders have been proposed in literature, such as WO 2016/064810.

Unfortunately, because of the conditions under which many fabrics are used, completely successful ink compositions have not been developed. Also, such systems require an extensive pre-treatment procedure as described i.e. in US 2014/0068877. The mentioned method pertains to inkjet printing on textiles including using a pre-treatment solution containing poly(acrylic) acid, hydrophilic copolymers of poly(acrylic) acid or mixtures thereof to control bleed. In addition, current procedures include an energy-intensive finishing procedure including i.e. a drying step. In this respect, EP 2 643 159 discloses method of digital printing and finishing for fabrics and the like, comprising: a step of unwinding a fabric from a first reel,—a step of compensating the speeds and of spreading the fabric for its positioning on a conveyor belt provided with supporting means on which a digital printing step occurs,—a step of drying the fabric,—a step of winding the fabric onto a second reel, these steps being executed at corresponding stations arranged in sequence with respect to each other and the fabric passing through them continuously, transversely to the conveyor belt, there being a plurality of bars provided with printing heads which are controlled electronically and synchronized with the movement of the conveyor belt.

It is therefore an object to provide a ink composition which is easy to apply, cures at room temperature, and which will remain on the fabric when exposed to most common cleaning and usage conditions, i.e., which have a high colour strength and crock fastness. It is another objective to provide a textile which is printed with the ink composition provided and to provide a method of printing a textile with the composition. It is further an object of the present invention to provide a printing process for textiles which do not require an exhaustive pre- and after-treatment step.

SUMMARY OF THE INVENTION

In a first aspect, the present invention provides a water-based ink comprising nanopigment micelles, said nanopigment micelles comprising a pigment particle and a polymeric dispersing agent around said pigment particle, whereby said pigment particles have an average particle size between 100 nm and 250 nm, as determined by ISO 13320:2009.

In a second aspect, the present invention provides a pigmented textile obtainable by contacting a textile with a water-based ink according to the first aspect of the invention and subsequently fixating said water-based ink onto said textile.

In a third aspect, the present invention provides a method for preparing a water-based ink according to the first aspect of the invention, comprising the steps of:
i. high shear mixing of pigment particles having an average particle size between 100 nm and 250 nm, as determined by ISO 13320:2009, and a polymeric dispersing agent in water, thereby obtaining nanopigment micelles; and
ii. adding water to said nanopigment micelles, thereby obtaining a water-based ink.

In a fourth aspect, the present invention provides a method for printing a textile material, comprising the steps of:
i. applying a water-based ink according to the first aspect of the invention onto a textile material; and
ii. fixating said water-based ink onto said textile material.

DESCRIPTION OF THE FIGURES

By means of further guidance, figures are included to better appreciate the teaching of the present invention. Said figures are intended to assist the description of the invention and are nowhere intended as a limitation of the presently disclosed invention.

The figures and symbols contained therein have the meaning as commonly understood by one of ordinary skill in the art to which this invention belongs.

DETAILED DESCRIPTION OF THE INVENTION

Figure 1:
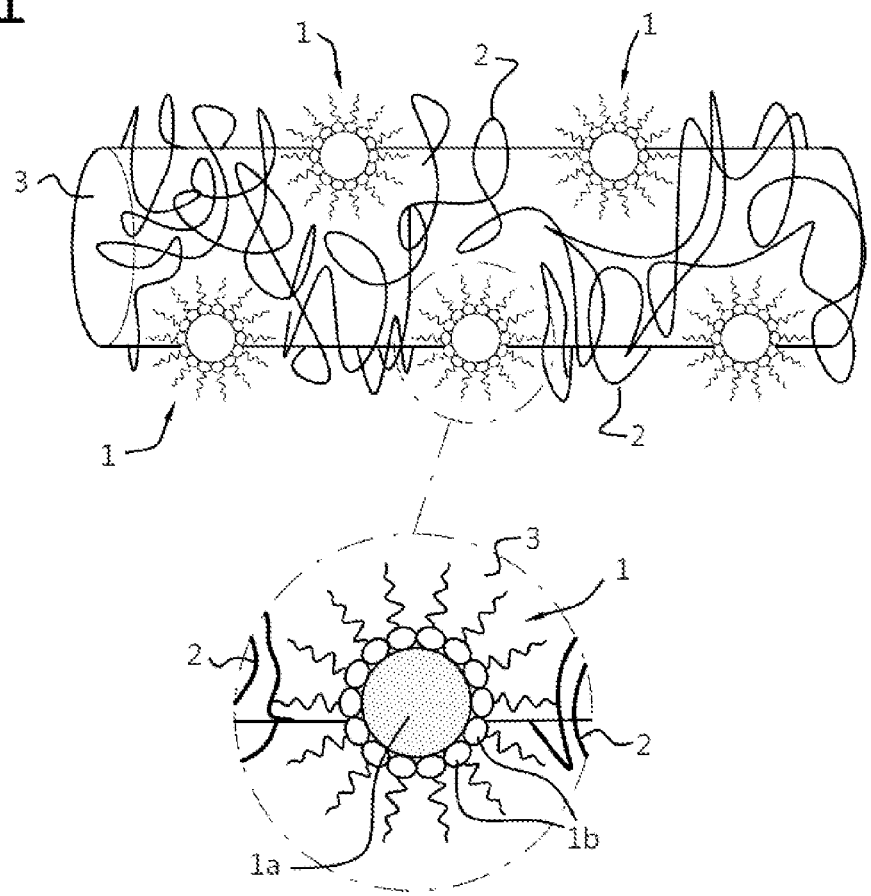
FIG. 1 shows a schematic depiction of the binding of nanopigment micelles to a textile fibre.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

As used herein, the following terms have the following meanings:

"A", "an", and "the" as used herein refers to both singular and plural referents unless the context clearly dictates otherwise. By way of example, "a compartment" refers to one or more than one compartment.

"About" as used herein referring to a measurable value such as a parameter, an amount, a temporal duration, and the like, is meant to encompass variations of +/−20% or less, preferably +/−10% or less, more preferably +/−5% or less, even more preferably +/−1% or less, and still more preferably +/−0.1% or less of and from the specified value, in so far such variations are appropriate to perform in the disclosed invention. However, it is to be understood that the value to which the modifier "about" refers is itself also specifically disclosed.

"Comprise," "comprising," and "comprises" and "comprised of" as used herein are synonymous with "include", "including", "includes" or "contain", "containing", "contains" and are inclusive or open-ended terms that specifies the presence of what follows e.g. component and do not exclude or preclude the presence of additional, non-recited components, features, element, members, steps, known in the art or disclosed therein.

The recitation of numerical ranges by endpoints includes all numbers and fractions subsumed within that range, as well as the recited endpoints. All percentages are to be understood as percentage by weight and are abbreviated as "wt. %", unless otherwise defined or unless a different meaning is obvious to the person skilled in the art from its use and in the context wherein it is used.

Polymeric Dispersing Agent

The polymeric dispersing agent used in the present invention is a copolymer each having at least one hydrophilic segment (A) and hydrophobic segment (B).

The polymeric dispersing agent of the structure having the hydrophilic segment and the hydrophobic segment can include a water-insoluble colouring agent, preferably a nanosized pigment, in its interior to stably disperse the colouring agent in a hydrophilic medium because the hydrophobic segment interacts with the water-insoluble colouring agent, while the hydrophilic segment has a strong force leading to be dissolved in the hydrophilic medium. This effect is useful for particles having a high specific gravity, and so a stable dispersion free of aggregation between particles can be formed of nanopigments or of composite particles obtained by combining a colouring material with inorganic fine particles. As a result, a water-based ink excellent in image fastness properties, colouring ability, dispersion stability and storage stability can be obtained.

No particular limitation is imposed on the configuration of the respective segments in the polymeric dispersing agent. However, the hydrophilic segment is preferably located at a terminal of a polymer chain from the viewpoint of enhancing the dispersibility of the colouring agent. Examples of the block form include AB, ABA' (A and A' may be the same or different from each other), AA'B and BB'A types. A, A', B and B' are segments of a homopolymer or copolymer.

The polymeric dispersing agent used in the present invention may be a block copolymer containing a hydrophilic segment composed of a homopolymer or copolymer of a vinyl ether type monomer and a hydrophobic segment composed of a homopolymer or copolymer of a vinyl ether type monomer.

These polymers preferably have a repeating unit structure represented by the following general formula (1):

In the general formula (1), $R_1$ is an aliphatic or alicyclic hydrocarbon group such as an alkyl, alkenyl, cycloalkyl or cycloalkenyl group, or an aromatic hydrocarbon group, the carbon atom of which may be substituted by a nitrogen atom, such as a phenyl, pyridyl, benzyl, toluyl, xylyl, alkylphenyl, phenylalkylene, biphenyl or phenylpyridyl group. A hydrogen atom on the aromatic ring may be substituted by a hydrocarbon group. $R^1$ preferably has 1 to 18 carbon atoms.

$R_1$ may be a group represented by —(CH($R^2$)—CH($R^3$)—O)$_p$—$R^4$ or —(CH$_2$)$_m$—(O)$_n$—$R^4$. In this case, $R^2$ and $R^3$ are, independently of each other, hydrogen or methyl, $R^4$ is an aliphatic or alicyclic hydrocarbon group such as an alkyl, alkenyl, cycloalkyl or cycloalkenyl group, an aromatic hydrocarbon group, the carbon atom of which may be substituted by a nitrogen atom (a hydrogen atom on the aromatic ring may be substituted by a hydrocarbon group), such as a phenyl, pyridyl, benzyl, toluyl, xylyl, alkylphenyl, phenylalkylene, biphenyl or phenylpyridyl group, —CHO, —CH$_2$CHO, —CO—CH=CH$_2$, —CO—C(CH$_3$)=CH$_2$, —CH$_2$—CH=CH$_2$, —CH$_2$=C(CH$_3$)=CH$_2$, or —CH$_2$—COOR$^5$, with the proviso that hydrogen atoms in each group may be substituted by halogen atoms such as fluorine, chlorine and bromine within limits chemically permitted, and $R^4$ preferably has 3 to 18 carbon atoms, $R^5$ is hydrogen or an alkyl group, p is preferably 1 to 18, m is preferably 1 to 36, and n is preferably 0 or 1.

In $R_1$ and $R^5$, examples of the alkyl and alkenyl groups include methyl, ethyl, propyl, isopropyl, n-butyl, sec-butyl, t-butyl, pentyl, hexyl, heptyl, octyl, nonyl, decyl, dodecyl, tetradecyl, hexadecyl, octadecyl, oleyl and linoleyl groups, and examples of the cycloalkyl and cycloalkenyl groups include cyclopropyl, cyclobutyl, cyclopentyl, cyclohexyl, cyclooctyl and cyclohexenyl groups.

Alternatively, said polymeric dispersing agent used in the present invention may be a block copolymer containing a hydrophilic segment composed of a homo- or co-polyether block amide, a polyoxazoline and/or a copolyamide and a hydrophobic segment composed of a homo- or co-polyether block amide, a polyoxazoline and/or a copolyamide. Polyether block amide or PEBA is a thermoplastic elastomer (TPE). It is a block copolymer obtained by polycondensation of a carboxylic acid polyamide (PA6, PA11, PA12) with an alcohol termination polyether (Polytetramethylene glycol PTMG), PEG). Preferably, said polymeric dispersing agent used in the present invention comprises a block copolymer containing at least a hydrophilic segment of polyether block amide and/or a polyoxazoline; and at least a hydrophobic segment of polyether block amide and/or a polyoxazoline.

The inventors have surprisingly found that said polymeric dispersing agent used in the present invention is preferably a block copolymer containing a hydrophilic segment composed of a copolyamide and a hydrophobic segment composed of a copolyamide. Copolyamides are especially preferred as thermoplastic material because of their excellent fusing temperature, very good adhesion properties to a variety of different substrates, are easy to process and environmentally friendly, show high resistance towards washing and (chemical) cleaning treatments such as steam and enzyme wash, stonewash and post-dyeing treatments, and high heat resistance. As such copolyamides are especially preferred materials. In a more preferred embodiment, said copolyamides are provided with a softening point between 90° C. and 140° C., more preferably between 100° C. and 130° C. and even more preferably between 105° C. and 125° C., determined according to VICAT method ASTM-D1525. In a most preferred embodiment, said copolyamides have a softening point between 110° C. and 120° C., such as 110° C., 112° C., 114° C., 116° C., 118° C. or 120° C. or any value there in between. This ensures that the copolyamides are sufficiently resistant to higher microclimate temperatures of about 80° C. and are sufficiently molten at processing temperatures of about 130° C. to 150° C.

The inventors have found that alternatively said polymeric dispersing agent used in the present invention is preferably a block copolymer containing a hydrophilic segment composed of a polyoxazoline and a hydrophobic segment composed of a polyoxazoline. Polyoxazolines are especially preferred because of good crock fastness and good sublimation fastness, very good adhesion properties to a variety of different substrates, are easy to process and environmentally friendly, show high resistance towards washing and post-dyeing treatments. As such polyoxazolines are especially preferred materials. In a more preferred embodiment, said polyoxazolines are provided with a softening point between 90° C. and 140° C., more preferably between 100° C. and 130° C. and even more preferably between 105° C. and 125° C., determined according to VICAT method ASTM-D1525. In a most preferred embodiment, said polyoxazolines have a softening point between 110° C. and 120° C., such as 110° C., 112° C., 114° C., 116° C., 118° C. or 120° C. or any value there in between. This ensures that the polyoxazolines are sufficiently resistant to higher microclimate temperatures of about 80° C. and are sufficiently molten at processing temperatures of about 130° C. to 150° C.

Proportions of the hydrophilic segment and hydrophobic segment contained in the block copolymer in the present invention are preferably 10 to 90% by mole and 90 to 10% by mole, respectively.

The number average molecular weight of the block copolymer is preferably between 500 and 20,000,000 g/mol, more preferably between 1,000 and 2,000,000 g/mol, most preferably between 2,000 and 500,000 g/mol. Even more preferably, said number average molecular weight of the block copolymer is between 3,000 and 100,000 g/mol, more preferably between 3,500 and 50,000 g/mol, most preferably between 4,000 and 30,000 g/mol. In an especially preferred embodiment, said block copolymer has a number average molecular weight of 500 g/mol, 1,000 g/mol, 2,000 g/mol, 4,000 g/mol, 6,000 g/mol, 8,000 g/mol, 10,000 g/mol, 12,000 g/mol, 14,000 g/mol, 16,000 g/mol, 18,000 g/mol or 20,000 g/mol. In an even more preferred embodiment, said block copolymer has a number average molecular weight of 500 g/mol, 750 g/mol, 1,000 g/mol, 2,000 g/mol, 3,000 g/mol, 4,000 g/mol or 5,000 g/mol.

These block copolymers may be graft-bonded to another polymer or copolymerized with another repeating unit structure.

No particular limitation is imposed on a synthesizing process of the copolymer having a vinyl ether type polymer block. However, cationic living polymerization by Aoshima, et al (Japanese Patent Application Laid-Open Nos. H11-322942 and H11-322866), or the like is preferably used. By using the cationic living polymerization process, various polymers such as homopolymers, copolymers composed of two or more monomers, block polymers, graft polymers and graduation polymers can be synthesized with their chain lengths (molecular weights) exactly made uniform. Further, in the polyvinyl ether, various functional groups can be introduced into side chains thereof. Synthetic processes for block copolymers comprised of polyether block amides, polyoxazoline and copolyamides are well described in the state of the art.

The proportion of the block copolymer contained in the ink in the present invention is preferably 0.001 to 40 wt. %, more preferably 0.01 to 20 wt. % based on the total weight of the ink. When the amount of the block copolymer is 0.001 to 40 wt. %, the resulting ink can provide an image having preferable rub-off resistance, and exhibits preferable ejection stability because the viscosity of the ink does not become too high.

Pigment Particle

The colour agent used in the present invention is pigment particles of a natural and/or synthetic origin and may be constituted of organic and/or inorganic particles, and are preferably insoluble in water or aqueous media.

Inorganic pigment particles may be selected from, but not limited to:

purple pigments: Ultramarine violet (PV15) silicate of sodium and aluminium containing sulphur, Han Purple $BaCuSi_2O_6$, Cobalt Violet (PV14) cobaltous orthophosphate, Manganese violet $NH_4MnP_2O_7$ (PV16) manganic ammonium pyrophosphate;

blue pigments: Ultramarine (PB29), Persian blue, Cobalt Blue (PB28) and Cerulean Blue (PB35) cobalt(II) stannate, Egyptian Blue a synthetic pigment of calcium copper silicate $(CaCuSi_4O_{10})$, Han Blue $BaCuSi_4O_{10}$, Azurite cupric carbonate hydroxide $(Cu_3(CO_3)_2(OH)_2)$, Prussian Blue (PB27) a synthetic pigment of ferric hexacyanoferrate $(Fe_7(CN)_{18})$, YInMn Blue $(YIn_{1-x}Mn_xO_3)$, selected copper phtalocyanines;

green pigments: Chrome green (PG17) chromic oxide $(Cr_2O_3)$, Viridian (PG18) a dark green pigment of hydrated chromic oxide $(Cr_2O_3.H_2O)$, Cobalt green also known as Rinman's green or Zinc green $(CoZnO_2)$, Malachite cupric carbonate hydroxide $(Cu_2CO_3(OH)_2)$, Paris Green cupric acetoarsenite $(Cu(C_2H_3O_2)_2.3Cu(AsO_2)_2)$, Scheele's Green (also called Schloss Green): cupric arsenite $(CuHAsO_3)$, Verdigris various poorly soluble copper salts, notably cupric acetate $(Cu(CH_3CO_2)_2)$ and malachite $(Cu_2CO_3(OH)_2)$, selected copper phtalocyanines, Green earth also known as terre verte and Verona green (K[(Al,FeIII),(FeII,Mg](AlSi$_3$, Si$_4$)O$_{10}$(OH)$_2$);

yellow pigments: aureolin (also called Cobalt Yellow) (PY40) potassium cobalt nitrite (K$_3$Co(NO$_2$)$_6$), Yellow Ochre (PY43) a clay of monohydrated ferric oxide (Fe$_2$O$_3$.H$_2$O), Titanium Yellow (PY53), Mosaic gold: stannic sulphide (SnS$_2$);

red pigments: Sanguine, Caput Mortuum, Indian Red, Venetian Red, Oxide Red (PR102), Red Ochre (PR102) anhydrous Fe$_2$O$_3$, Burnt Sienna (PBr7);

brown pigments: Raw Umber (PBr7) a natural clay pigment consisting of iron oxide, manganese oxide and aluminium oxide: Fe$_2$O$_3$+MnO$_2$+nH$_2$O+Si+AlO$_3$, Raw Sienna (PBr7) limonite clay;

black pigments: Carbon Black (PBk7), Ivory Black (PBk9), Vine Black (PBk8), Lamp Black (PBk6), Mars Black (Iron black) (PBk11) (C.I. No. 77499) Fe3O4, manganese dioxide (MnO$_2$), titanium(III) oxide (Ti$_2$O$_3$);

white pigments: stibous oxide (Sb$_2$O$_3$), barium sulphate (BaSO$_4$), lithopone (BaSO$_4$*ZnS), titanium dioxide (TiO$_2$), zinc oxide (ZnO).

Said inorganic pigments used in the present invention, may be applied oxides, nitrides, chlorides, sulphates, carbonates, etc. The use of pigments adds to the invention in that colour fastness is improved, especially when multiple washing cycles are required and in that no coupling agents, such as i.e. alkoxysilane, silane coupling agent, titanate coupling agent or the like, are required for coupling or strengthen the bonding a colouring material to a support material such as silica, alumina, titanium oxide, zinc oxide, zirconium oxide or iron oxide supports. Specific examples of said inorganic pigments include silica, alumina, titanium oxide, zinc oxide, zirconium oxide, iron oxide, nickel oxide, copper oxide, barium sulphate and calcium carbonate.

Likewise, organic pigment particles known to the person skilled in the art may be selected, such as but not limited to, azo pigments, phthalocyanines, quiacridone, diaryl pyrrolopyrroles, lithol, toluidine derivatives, pyrazolones, dinitroaniline, Hansa yellow, indanthrenes, dioxazine and benzimidazolone.

No particular limitation is imposed on the form of the pigment particles. With respect to the size of the pigment particles, the average particle diameter is preferably 1 μm or smaller, more preferably 0.25 μm or smaller. Said pigment particles having a preferred average particle diameter may be obtained by grinding a commercially available pigment particle, i.e. using a ball grinder, to a predetermined size.

The proportion of the pigment particles contained in the ink is preferably 0.1 to 20 wt. %, more preferably 1 to 15 wt. % based on the total weight of the ink, and most preferably 1 to 10 wt. %. More preferably, said pigment particles are comprised in the ink in an amount of 1 to 5 wt. %, and even more preferably in an amount of 1 wt. %, 2 wt. %, 3 wt. %, 4 wt. % or 5 wt. %, or any amount there in between When the amount of the composite particles is 0.1 to 20 wt. %, the resulting ink can provide a print having a preferable image density.

Binder Polymer

In a preferred embodiment, the present invention provides a water-based ink according to the first aspect of the invention, further comprising a binding agent in an amount of less than 20 wt. %, relative to the total weight of said water-based ink, preferably less than 10 wt. %. More preferably, said binding agent is comprised in an amount of less than 5 wt. %, relative to the total amount of said water-based ink, preferably less than 3 wt. %. More preferably, said binding agent is comprised in an amount of less than 2.5 wt. %, less than 2.0 wt. %, less than 1.5 wt. %, less than 1.0 wt. % or even less than 0.5 wt. %. Most preferably, no binding agent is comprised in said water-based ink. Said binding agent may comprise one or more than one binding resin selected from, but not limited to acyrlics, alkyds, cellulose derivatives, rubber resins, ketones, maleics, formaldehydes, (isocyanate free) polyurethanes, epoxides, fumarics, hydrocarbons, polyvinyl butyral, polyamides, Shellac and phenolics. The person skilled in the art will know how to selected a suitable binding agent or combination of binding agents to obtain desired properties such as gloss and resistance to heat, chemicals and water.

In one embodiment, said binding agent is comprised in an amount of between 0.5 to 2.5 wt. %, relative to the total weight of the composition, and said polymeric dispersing agent has a number average molecular weight of 4,000 to 30,000 g/mol, preferably of 4,000 g/mol, 6,000 g/mol, 8,000 g/mol, 10,000 g/mol, 12,000 g/mol, 14,000 g/mol, 16,000 g/mol, 18,000 g/mol or 20,000 g/mol. Preferably, said binding agent is comprised in an amount between 1.0 and 2.0 wt. % and more preferably in an amount of 1.1, 1.3, 1.4, 1.5, 1.6, 1.7, 1.8, 1.9 or 2.0 wt. %, or any amount there in between. It was found that better crock fastness was obtained using for such inks compared to inks of the prior art.

In another embodiment, said binding agent is comprised in an amount of less than 0.5 wt. %, relative to the total weight of the composition, and said polymeric dispersing agent has a number average molecular weight higher than 4,000 g/mol, 6,000 g/mol, 8,000 g/mol, 10,000 g/mol, 12,000 g/mol, 14,000 g/mol, 16,000 g/mol, 18,000 g/mol or even higher than 20,000 g/mol. Preferably, said binding agent is comprised in an amount of less than 0.25 wt. %, less than 0.10 wt. %, less than 0.05 wt. %, or even less than less than 0.01 wt. %. Most preferably said binding agent is not comprised in said ink. Preferably, said polymeric dispersing agent has a number average molecular weight higher than 20,000 g/mol, 25,000 g/mol, 30,000 g/mol, 40,000 g/mol, 45,000 g/mol or even higher than 50,000 g/mol. It was found that better crock fastness was obtained using for such inks compared to inks of the prior art.

Liquid Medium

A principal solvent of the water-based ink according to the present invention is water. Distilled water, ion-exchanged water or the like may be used as the water. The proportion of water in the ink is preferably 60 to 98 wt. %, more preferably 70 to 98 wt. %, and even more preferably 80 to 98 wt. % based on the total weight of the ink, and most preferably more preferably 80 to 96 wt. % based on the total weight of the ink. Especially preferred, said ink has a water content of at least 81 wt. %, at least 83 wt. %, at least 85 wt. %, at least 87 wt. %, at least 89 wt. % or at least 91 wt. % and of at most 98 wt. %, at most 97 wt. %, at most 96 wt. % or at most 95 wt. %.

The solvent of the water-based ink according to the present invention may contain any other water-soluble organic substance than water. When the ink according to the present invention is used in an ink-jet printer, the organic substance acts on the prevention of solidification of the ink caused by drying at orifices. Specific examples thereof include alcohols such as isopropanol, butanol; diols such as ethylene glycol, diethylene glycol, triethylene glycol, tetraethylene glycol, propylene glycol, dipropylene glycol, tripropylene glycol, 1,2-butanediol, 1,3-butanediol, 1,4-butanediol, thiodiglycol, neopentyl glycol, 1,4-cyclohexanediol and polyethylene glycol; monoalkyl ethers of alkylene glycols, such as ethylene glycol monomethyl ether, ethylene glycol monoethyl ether, ethylene glycol monoisopropyl ether, ethylene glycol monoallyl ether, diethylene glycol monomethyl ether, diethylene glycol monoethyl ether, diethylene glycol monobutyl ether, triethylene glycol monomethyl ether, triethylene glycol monoethyl ether, propylene glycol monomethyl ether and dipropylene glycol monomethyl ether; polyols such as glycerol, 1,2,4-butanetriol, 1,2,5-pentanetriol, 1,2,6-hexanetriol, trimethylolethane, trimethylolpropane and pentaerythritol; cyclic ethers such as tetrahydrofuran and dioxane; and besides dimethyl sulfoxide, diacetone alcohol, glycerol monoallyl ether, N-methyl-2-pyrrolidone, 2-pyrrolidone, γ-butyrolactone, 1,3-dimethyl-2-imidazolidinone, sulfolane, urea, β-dihydroxyethylurea, acetonylacetone, dimethylformamide, dimethylacetamide and phenoxyethanol. These organic substances may be either solid or liquid so far as they are soluble in water. The organic substances desirably have a boiling point higher than water, more desirably a boiling point of 120° C. or higher because they are required to remain in the ink even under such conditions as water is evaporated. However, they are not limited to high-boiling substances because they become hard to be evaporated owing to the interaction with the polymeric dispersing agent compared with the case where they are present singly. These organic substances may be used either singly or in any combination thereof. The proportion of these organic substances in the ink is less than 50 wt. % based on the total weight of the ink, preferably less than 25 wt. %, preferably less than 20 wt. %, preferably less than 15 wt. %, preferably less than 12 wt. %, preferably less than 10 wt. %, preferably less than 7 wt. % and more preferably less than 5 wt. % based on the total weight of the ink, and even less than 3 wt. % or even less than 1 wt. %. Most preferably, the water-based ink is free of said organic substances. Reduction of the amount of organic solvent yields a more environmentally friendly ink.

Water-Based Ink

The current invention provides in a solution for at least one of the above mentioned problems by providing a water-based ink comprising pigment nanoparticles and printed textiles obtained therefrom, as described above.

In a first aspect, the present invention provides a water-based ink comprising nanopigment micelles, said nanopigment micelles comprising a pigment particle and a polymeric dispersing agent around said pigment particle, whereby said pigment particles have an average particle size between 100 nm and 250 nm, as determined by ISO 13320: 2009.

The inventors found that proprietary developed polymeric dispersing agents provided high stability of the pigment particles in a water-based medium, while in addition provided for enhanced adhesion of the pigment particles to the recording medium, more specifically to the printed textile. Also, the inventors found that the average particle size of said pigment particles is preferably as small as possible, i.e. lower than 250 nm, but also that said pigment particles should have an average particle size that is sufficiently high, i.e. higher than 100 nm. Without being bound to any mechanistic theories, it is rationalized that sufficiently small pigment particles better penetrate the textile while sufficiently big pigment particles become better encapsulated within the recording medium, i.e. textile, microstructure.

In a preferred embodiment, the present invention provides a water-based ink according to the first aspect of the invention, whereby said pigment particles have an average particle size of higher than 110 nm, preferably higher than 120 nm, higher than 130 nm, higher than 140 nm and even higher than 150 nm. A higher average particle size was found to exhibit less leaching of the pigment particles from the printed textiles where onto the ink is printed or dyed. This can be understood by an improved penetration of the pigment particles into the recording material, more specifically into the textile fibres. As a result, a better colour fastness is experienced after multiple washing cycles. FIG. 1 illustrates schematically nanopigment micelles (1) comprised of pigment particles (1a) and a layer of polymeric dispersing agent (1b) to improve bonding to the textile substrate (3).

In a preferred embodiment, the present invention provides a water-based ink according to the first aspect of the invention, whereby said pigment particles have an average particle size of lower than 200 nm, preferably lower than 190 nm, lower than 180 nm and even lower than 170 nm. A lower average particle size was found to exhibit better penetration of the pigment particles during the printing or colouring step. As a result, more pigment particles can be adsorbed to the recording material, more specifically to a textile.

Most preferably, said pigment particles have an average particle size of about 150 nm, 152 nm, 154 nm, 156 nm, 158 nm, 160 nm, 162 nm, 164 nm, 166 nm, 168 nm or 170 nm, or any value there in between. Pigment particles with said dimensions have been shown to provide optimised penetration and retention characteristics relative to the recording medium, i.e. a printed textile.

In a preferred embodiment, the present invention provides a water-based ink according to the first aspect of the invention, whereby said nanopigment micelles are obtained by high shear mixing of said pigment particles and said polymeric dispersing agent. High shear mixing of said pigment particles in presence of said polymeric dispersing agent allows for a very high adhesion of the polymeric dispersing agent to said pigment particles and thus to form highly stable nanopigment micelles.

In a preferred embodiment, the present invention provides a water-based ink according to the first aspect of the invention, whereby said nanopigment micelles have an average particle size of lower than 1000 nm, preferably lower than 750 nm, lower than 500 nm and even lower than 400 nm. The average particle size and the particle size distribution of nanopigment micelles is determined using a Mastersizer 3000 Laser Diffraction Particle Size Analyser. A lower average particle size was found critical for good printability and print quality. Also, more pigment particles can be adsorbed to the recording material, more specifically to a textile.

Most preferably, said nanopigment micelles have an average particle size of about 150 nm, 160 nm, 170 nm, 180 nm, 190 nm, 200 nm, 210 nm, 220 nm, 230 nm, 240 nm or 250 nm, or any value there in between. Nanopigment micelles with said dimensions have been shown to provide optimised penetration and retention characteristics relative to the recording medium, i.e. a printed textile.

In a preferred embodiment, the present invention provides a water-based ink according to the first aspect of the invention, whereby said water-based ink has a viscosity of 1 mPa·s to 15 mPa·s as determined with a Brookfield viscometer at 25° C. More preferably, said viscosity is comprised between 2 mPa·s and 14 mPa·s. Most preferably, said viscosity is 2 mPa·s, 4 mPa·s, 6 mPa·s, 8 mPa·s, 10 mPa·s, 12 mPa·s, 14 mPa·s or any value there in between. Most preferably said water-based ink has a viscosity between 4 mPa·s and 6 mPa·s. Such viscosity was found especially suitable for printing purposes. The optimal viscosity can be achieved by applying viscosity modifying agents as known to the person skilled in the art and/or by reducing the molecular weight of the binding polymer agent.

In a preferred embodiment, the present invention provides a water-based ink according to the first aspect of the invention, whereby said water-based ink has a pH of 7 to 10 at 25° C. More preferably, said viscosity is comprised between 7 and 9. Most preferably, said viscosity is equal to 7.0, 7.2, 7.4, 7.6, 7.8, 8.0, 8.2, 8.4, 8.6, 8.8 or 9.0, or any value there in between.

In a preferred embodiment, the present invention provides a water-based ink according to the first aspect of the invention, wherein said polymeric dispersing agent is a block copolymer of a polyvinyl ether, a polyether block amide, a polyoxazoline and/or a copolyamide having at least one hydrophilic segment and at least one hydrophobic segment.

In a more preferred embodiment, the present invention provides a water-based ink according to the first aspect of the invention, wherein said polymeric dispersing agent is an ABA-block copolymer comprising a polyoxazoline and/or a copolyamide.

In a preferred embodiment, the present invention provides a water-based ink according to the first aspect of the invention, wherein said polymeric dispersing agent has a number average molecular weight of between 4,000 and 500,000 g/mol, preferably of between 6,000 and 300,000 g/mol. Preferably, said ink further comprises a binder polymer in an amount of less than 5 wt. %, relative to the total amount of said water-based ink, preferably less than 3 wt. %, more preferably less than 2 wt. %, and even more preferably less than 1 wt. %. Most preferably, said water-based ink does not comprise any binder polymer.

In a preferred embodiment, the present invention provides a water-based ink according to the first aspect of the invention, wherein said polymeric dispersing agent is a block copolymer of a polyvinyl ether having at least one hydrophilic segment and at least one hydrophobic segment.

In a preferred embodiment, the present invention provides a water-based ink according to the first aspect of the invention, wherein said polymeric dispersing agent is an ABA-block copolymer comprising a polypropylene oxide B-segment and polyethylene oxide A-segments.

In a preferred embodiment, the present invention provides a water-based ink according to the first aspect of the invention, wherein said polymeric dispersing agent has a number average molecular weight of at least 4,000 g/mol, preferably at least 6,000 g/mol. A sufficiently high number average molecular of the B-segments weight ensures a sufficiently high adhesion of the B-segments to the pigment particle while a sufficiently high number average molecular of the B-segments weight ensures a sufficiently high stability of the micelles in the aqueous medium.

In order to improve dispersion stability and inclusion property, the molecular motion of the block copolymer is preferably more flexible because such a polymer becomes easy to physically entangle with the surface of the water-insoluble pigment particle and have affinity for the pigment particle. The block copolymer is preferably also flexible from the viewpoint of entanglement and/or fusion of of the hydrophobic segment(s) on a recording medium. Therefore, the glass transition temperature $T_g$, determined according to ISO 11357-2: Plastics—Differential scanning calorimetry—Part 2: Determination of glass transition temperature (1999), of the main chain of the block copolymer is preferably 20° C. or lower, more preferably 0° C. or lower, still more preferably −20° C. or lower. In this regard, the polymer having the polyvinyl ether structure is preferably used because it generally has a low glass transition point and flexible properties.

Further, in order to realize the included state, a preferred form of the block copolymer used in the present invention is a polymer having a relatively high molecular weight, i.e. 6,000 or higher, preferably 9,000 or higher, more preferably 15,000 or higher in terms of a number average molecular weight. The number average molecular weight of the hydrophobic segment is 4,000 or higher, preferably 6,000 or higher. By taking such a form, the block copolymer is easy to form a stable nanopigment micelle structure, and pigment particles can be satisfactorily dispersed by including the pigment particles in a core part of the nanopigment micelle. The confirmation of the included state can be performed by various kinds of electron microscopes and/or instrumental analyses such as X-ray diffraction.

In a preferred embodiment, the present invention provides a water-based ink according to the first aspect of the invention, whereby said nanopigment micelles are comprised of 10 wt. % to 90 wt. % of said pigment particles and of 90 wt. % to 10 wt. % of said polymeric dispersing agent, preferably of 40 wt. % to 60 wt. % of said pigment particles and of 60 wt. % to 40 wt. % of said polymeric dispersing agent.

In a preferred embodiment, the present invention provides a water-based ink according to the first aspect of the invention, whereby said nanopigment micelles are comprised in an amount of 1.0 to 25.0 wt. %, relative to the total weight of said water-based ink, preferably in an amount of 1.0 to 10.0 wt. %, and more preferably in an amount of 1.0 to 5.0 wt. %, such as i.e. 1.0 wt. %, 2.0 wt. %, 3.0 wt. %, 4.0 wt. % or 5.0 wt. %. A sufficiently high amount of nanopigment micelles in the ink according to the invention allows for a sufficiently high colour intensity upon printing or dyeing. Simultaneously, when the amount of nanopigment micelles in the ink according to the invention is too high, the water-based ink may become too viscous to be appropriately printed on a recording medium.

Various kinds of additives, for example, plasticizers, waxes, surfactants, pH adjustors, antioxidants, mildew-proofing agents, drying agents, chelating agents, alkali agents, defoaming agents, etc. may be added to the ink according to the present invention in addition to the above-described components.

In a preferred embodiment, the present invention provides a water-based ink according to the first aspect of the invention, whereby said water-based ink is substantially free of silane coupling agents. Also, in a preferred embodiment, the present invention provides a water-based ink according to the first aspect of the invention, whereby said water-based ink is substantially free of silica particles.

The ink according to the present invention may be suitably used in an ink-jet recording method, in which energy is applied to an ink to eject it, thereby conducting recording. As the energy, may be used thermal energy or mechanical energy. However, the method using the thermal energy is particularly preferred. A printer for ink-jet recording may be applied to a household printer, in which A4-sized paper is mainly used, a printer for business cards and cards, a large-scale printer for business use, or the like. However, it is suitably used to the large-scale printer of which particularly high image fastness properties are required, and which uses a great amount of an ink. Examples of recording media, on which recording is conducted with the ink according to the present invention, include plain paper, on which no special coating is applied, the so-called ink-jet paper with at least one side thereof coated with an ink-receiving layer, postal cards, paper for business card, paper for label, corrugated cardboards and films for ink-jet.

In a second aspect, the present invention provides a pigmented textile obtainable by contacting a textile with a water-based ink according to the first aspect of the invention and subsequently fixating said water-based ink onto said textile. The contacting step may be a printing or impregnation step. The fixating step essentially consists of drying of the water-based ink applied onto the textile substrate. Alternatively, the present invention provides a pigmented article obtainable by contacting an article with a water-based ink according to the first aspect of the invention and subsequently fixating said water-based ink onto said article. Said article may be paper, plastic, wood, wood veneer, etc.

In a preferred embodiment, the present invention provides a pigmented textile according to the second aspect of the invention, whereby said textile is selected from the group comprising wool, cotton, silk, polypropylene, ((ultra) high molecular weight) polyethylene, polyamides such as aliphatic polyamides (i.e. nylon-6, nylon-6,6) and aromatic polyamides (i.e. Kevlar®, Nomex®), viscose, cellulose or polyester. The inventors found that various textile substrate materials were efficiently printed or dyed using the water-based ink according to the invention. The may be rationalized by the universal binding mechanism of the nanopigment micelles which is based on physical binding by entanglement of the polymeric dispersing agent with the textile substrate rather than on mere adhesion.

Figure 2:
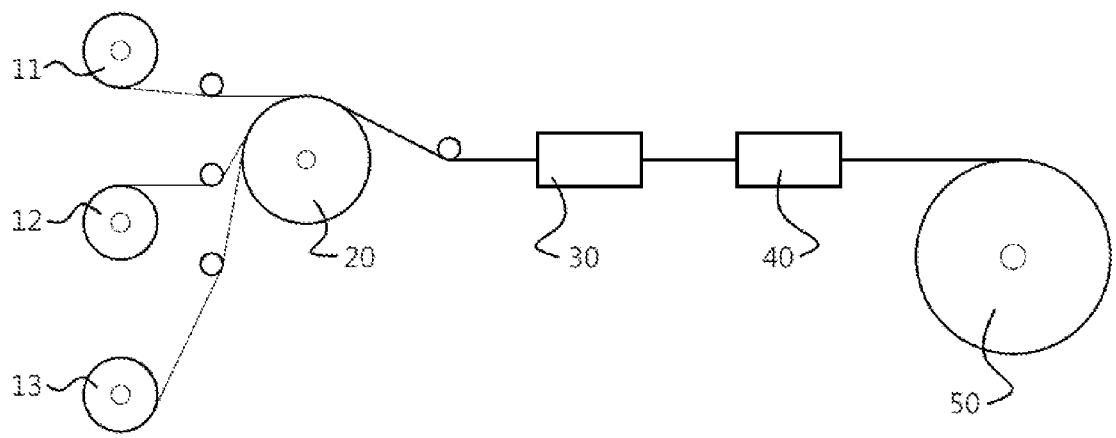
FIG. 2 shows a schematic depiction of a resourceful, energy-efficient textile printing process using nanopigment micelles-based ink according to the invention.

In a preferred embodiment, the present invention provides a pigmented textile according to the second aspect of the invention, whereby said textile is not pre-treated before contacting said textile with said water-based ink. Due to the mode of bonding of the nanopigment micelles to the textile substrate, the inventors found that no additional pre-treatment of textile substrate is required. Additionally, absence of a pre-treatment step allows for one printing or dyeing process line to be able to print or dye different substrate materials, without the need to interrupt the printing or dyeing process. This is illustrated in FIG. 2. FIG. 2 shows multiple rolls, 11, 12, 13, each with a different textile material (i.e. polyester, polyamide and cotton). The specific textile material is fed to a feeder roll 20 which feeds a digital printer 30 without additional pre-treatment step between the feeder roll 20 and the printer 30. After the printing step, the material is immediately fed to a fixating unit 40 and finally led to a receiving roll 50.

In a preferred embodiment, the present invention provides a pigmented textile according to the second aspect of the invention, whereby said textile is not rinsed after contacting said textile with said water-based ink. The inventors found as well a high degree, quantitatively, of bonding of the water-based ink according to the invention. Consequently, no rinsing step was required before fixating of the nanopigment micelles to the substrate. Avoiding said rinsing step, whereby the textile material is washed, is advantageous in that the process requires no water other than the water present in the ink composition. Also, avoiding the rinsing step is advantageous in that the substrate or textile substrate does not require an additional drying step.

In a third aspect, the present invention provides a method for preparing a water-based ink according to the first aspect of the invention, comprising the steps of:
 i. high shear mixing of pigment particles having an average particle size between 100 nm and 250 nm, as determined by ISO 13320:2009, and a polymeric dispersing agent in water, thereby obtaining nanopigment micelles; and
 ii. adding water to said nanopigment micelles, thereby obtaining a water-based ink.

The first step of high shear mixing allows for formation of a layer of polymeric dispersing agent around the pigment particles. This step can be done under dry conditions or under wet conditions, that is in presence of an amount of water. The second step of adding water allows to obtain a water-based ink having the desired concentration and/or viscosity for printing purposes.

In a preferred embodiment, the present invention provides a method for preparing a water-based ink according to the first aspect of the invention, whereby a pigment is wet grinded to said pigment particles in presence of water prior to high shear mixing. This is advantageous to allow for a safe handling of the nanoparticles. Specifically, no additional measures for handling of the nanoparticles are required.

In a fourth aspect, the present invention provides a method for printing a textile material, comprising the steps of:
 i. applying a water-based ink according to the first aspect of the invention onto a textile material; and
 ii. fixating said water-based ink onto said textile material.

In a preferred embodiment, the present invention provides a method for printing a textile material, whereby said textile material is not pre-treated before step i. Also, in a preferred embodiment, the present invention provides a method for printing a textile material, whereby said textile material is not rinsed after step i. Due to the specific properties of the polymeric dispersing agent, it was surprisingly found that these step are no longer essential in order to obtain a satisfactorily printed or dyed product.

EXAMPLES

In the following examples are intended to further clarify the present invention, and are nowhere intended to limit the scope of the present invention.

Example 1

An ink composition is prepared by mixing a 1.0 wt. % of 160 nm nanopigment with 2.0 wt. % of hydrophilic/hydrophobic polyvinyl ether block copolymer and 2.0 wt. % of acrylic binder polymer in water. The amount of organic solvents in the ink composition was less than 10 wt. %. The ink was printed with a 600×300 dpi resolution and 100% coverage, and the results were compared to a market standard ink. The results are compiled in Table 1.

TABLE 1

Behaviour of ink according to the invention, compared to ink according to prior art.

| | | Test Results | |
|---|---|---|---|
| Test Name | Test ID | Market Standard | Present invention |
| Wash Fastness (50° C.) | ISO105-C06 | 5 | 5 |
| | Shade change | 4 | 5 |
| | Colour Transfer | 5 | 5 |
| | Polyester | 4 | 5 |
| | Nylon | 4 | 5 |
| | Cotton | 4 | 5 |
| Light Fastness (Xenon Lamps 40 hrs) | ISO105-B02 | 5 | 6-7 |
| Dry Crock Fastness | ISO105-X12 | | |
| | 150° C. fixation | 3 | 4-5 |
| | 195° C. fixation | 4 | 5 |

TABLE 1-continued

Behaviour of ink according to the invention, compared to ink according to prior art.

| Test Name | Test ID | Test Results | |
| --- | --- | --- | --- |
| | | Market Standard | Present invention |
| Wet Crock Fastness | ISO105-X12 | | |
| | 150° C. fixation | 3 | 4 |
| | 195° C. fixation | 3 | 4 |
| Sublimation Fastness | ISO105-X11 | | |
| | 170° C. steaming on cotton | 4 | 5 |
| | 190° C. steaming on cotton | 4 | 5 |
| | 190° C. steaming on Polyester | 4 | 4-5 |
| | 190° C. steaming on Polyester | 2-3 | 4-5 |

Example 2

An ink composition is prepared by mixing a 1.0 wt. % of 160 nm nanopigment with 2.0 wt. % of hydrophilic/hydrophobic copolyamide block copolymer having a melting temperature of about 110° C. and 2.0 wt. % of acrylic binder polymer in water. The amount of organic solvents in the ink composition was less than 10 wt. %. The ink was printed with a 600×300 dpi resolution and 100% coverage, and the results were compared to a market standard ink.

Very good results were obtained in terms of wash fastness, crock fastness and sublimation fastness; excellent fusing temperature, very good adhesion properties to a variety of different substrates (i.e. elastane or spandex, nylons, polyesters, cotton, etc.), were easy to process and environmentally friendly, showed high resistance towards washing and (chemical) cleaning treatments such as steam and enzyme wash, stonewash and post-dyeing treatments, and exhibited a high heat resistance.

Example 3

An ink composition is prepared by mixing a 1.0 wt. % of 160 nm nanopigment with 2.5 wt. % of hydrophilic/hydrophobic polyoxazoline block copolymer having a melting temperature of about 110° C. and 2.0 wt. % of acrylic binder polymer in water. The amount of organic solvents in the ink composition was less than 10 wt. %. The ink was printed with a 600×300 dpi resolution and 100% coverage, and the results were compared to a market standard ink.

Very good results were obtained in terms of wash fastness, crock fastness and sublimation fastness.

The invention claimed is:

1. A water-based ink comprising nanopigment micelles (1), said nanopigment micelles (1) comprising a water-insoluble pigment particle (1a) and a polymeric dispersing agent (1b) around said pigment particle (1a), whereby said pigment particles (1a) have an average particle size between 150 nm and lower than 200 nm, as determined by ISO 13320:2009;
   wherein said polymeric dispersing agent (1b) is a block copolymer of a polyoxazoline having at least one hydrophilic segment and at least one hydrophobic segment; a binder polymer (2); and
   wherein said polyoxazoline has a softening point between 100° C. and 130° C.

2. Water-based ink according to claim 1, comprising 1 to 15 wt. % of organic solvent based on the total weight of the ink.

3. Water-based ink according to claim 1, comprising water in an amount of 80 to 98 wt. % based on the total weight of the ink.

4. Water-based ink according to claim 1, comprising, the binder polymer (2) in an amount of 0.5 to 5 wt. %, relative to the total amount of said water-based ink.

5. Water-based ink according to claim 1, whereby said pigment particles (1a) have an average particle size between 150 nm and 170 nm.

6. Water-based ink according to claim 1, whereby said nanopigment micelles (1) are obtained by high shear mixing of said pigment particles (1a) and said polymeric dispersing agent (1b).

7. Water-based ink according to claim 1, wherein said polymeric dispersing agent (1b) has a number average molecular weight of between 4,000 and 500,000 g/mol.

8. Water-based ink according to claim 7, comprising the binder polymer (2) in an amount of 0.5 to 5 wt. %, relative to the total amount of said water-based ink.

9. Water-based ink according to claim 1, whereby said nanopigment micelles (1) are comprised of 10 wt. % to 90 wt. % of said pigment particles (1a) and of 90 wt. % to 10 wt. % of said polymeric dispersing agent (1b).

10. Water-based ink according to claim 1, whereby said nanopigment micelles (1) are comprised in an amount of 1.0 to 25.0 wt. %, relative to the total weight of said water-based ink.

11. Water-based ink according to claim 1, whereby said water-based ink is free of silane coupling agents.

12. Water-based ink according to claim 1, whereby said water-based ink is free of silica particles.

13. A pigmented textile (3) obtained by contacting a textile (3) with said water-based ink according to claim 1 and subsequently fixating said water-based ink onto said textile.

14. Pigmented textile (3) according to claim 13, whereby said textile (3) is selected from the group consisting of wool, cotton, silk, polypropylene, polyester and nylon.

15. A method for preparing said water-based ink according to claim 1, comprising the steps of:
   i. high shear mixing of pigment particles (1a) having an average particle size between 150 nm and lower than 200 nm, as determined by ISO 13320:2009, and a polymeric dispersing agent (1b) in water, thereby obtaining nanopigment micelles (1); and
   ii. adding water to said nanopigment micelles (1), thereby obtaining a water-based ink.

16. Method according to claim 15, whereby a pigment is wet grinded to said pigment particles (1a) in presence of water prior to high shear mixing.

17. A method for printing a textile material (3), comprising the steps of:
   i. applying said water-based ink according to claim 1 onto a textile material (3), and
   ii. fixating said water-based ink onto said textile material (3) by drying.

18. Method according to claim 17, whereby said textile material (3) is not pre-treated before step i.

19. Method according to claim 17, whereby said textile material (3) is not rinsed after step i.

20. A water-based ink comprising nanopigment micelles (1), said nanopigment micelles (1) comprising a water-insoluble pigment particle (1a) and a polymeric dispersing agent (1b) around said pigment particle (1a), whereby said pigment particles (1a) have an average particle size between 150 nm and lower than 200 nm, as determined by ISO 13320:2009;

wherein said polymeric dispersing agent (1b) is a block copolymer of a copolyamide having at least one hydrophilic segment and at least one hydrophobic segment;

a binder polymer (2); and wherein said copolyamide has a softening point between 105° C. and 125° C.

21. A water-based ink comprising nanopigment micelles (1), said nanopigment micelles (1) comprising a water-insoluble pigment particle (1a) and a polymeric dispersing agent (1b) around said pigment particle (1a), whereby said pigment particles (1a) have an average particle size between 150 nm and lower than 200 nm, as determined by ISO 13320:2009;

wherein said polymeric dispersing agent (1b) is a block copolymer of at least one hydrophilic segment of a polyvinyl ether or a polyether block amide and at least one hydrophobic segment of a polyvinyl ether or a polyether block amide; and a binder polymer (2) in an amount of 0.5 to 3 wt. %, relative to the total amount of said water-based ink; and whereby said nanopigment micelles (1) are comprised of 40 wt. % to 60 wt. % of said pigment particles (1a) and of 60 wt. % to 40 wt. % of said polymeric dispersing agent (1b).

22. Water-based ink according to claim 1, wherein said polymeric dispersing agent (1b) has a number average molecular weight of between of between 6,000 and 300,000 g/mol.

23. Water-based ink according to claim 1, whereby said nanopigment micelles (1) are comprised in an amount of 3.0 to 10.0 wt. %, relative to the total weight of said water-based ink.

24. Water-based ink according to claim 1, comprising 1 to 10 wt. % of organic solvent based on the total weight of the ink.

* * * * *